United States Patent [19]
Heathcott et al.

[11] Patent Number: 6,007,070
[45] Date of Patent: Dec. 28, 1999

[54] PRESSURE ACTUATED PACKING ASSEMBLY

[76] Inventors: Joe William Heathcott, 3410 Kiamesha Cir., Missouri City, Tex. 77459; Jess L. Culpepper, 422 Bower Rd., Humble, Tex. 77338; Richard L. Varnado, 121 Black Branch Rd., Cold Spring, Tex. 77331

[21] Appl. No.: 08/895,760

[22] Filed: Jul. 17, 1997

[51] Int. Cl.⁶ ................ F16J 15/10; F16J 15/20
[52] U.S. Cl. .............. 277/510; 277/540; 277/532; 277/530
[58] Field of Search .................... 277/510, 527, 277/530, 531, 532, 534, 535, 540, 579, 582

[56] References Cited

U.S. PATENT DOCUMENTS

| | | | |
|---|---|---|---|
| 2,285,319 | 6/1942 | Wheeler | 277/530 |
| 2,542,701 | 2/1951 | Press | 285/97.8 |
| 2,726,104 | 12/1955 | Boitnott et al. | 285/96.1 |
| 3,379,460 | 4/1968 | Allyn | 285/312 |
| 4,103,909 | 8/1978 | Hoffman et al. | 277/530 X |
| 4,410,189 | 10/1983 | Myers et al. | 277/530 |
| 4,592,558 | 6/1986 | Hopkins | 277/530 |
| 4,618,154 | 10/1986 | Freudenthal | 277/530 X |
| 4,635,945 | 1/1987 | Beck | 277/530 |
| 4,660,869 | 4/1987 | Gabus | 285/365 |
| 4,998,755 | 3/1991 | Reeder | 285/181 |
| 5,472,216 | 12/1995 | Albertson et al. | 277/530 |

*Primary Examiner*—Lynne H. Browne
*Assistant Examiner*—John R. Cottingham
*Attorney, Agent, or Firm*—David M. O'Brian

[57] ABSTRACT

A pressure actuated packing assembly for use in sealing the annular area of fluid flow devices to provide and maintain an effective, long-term seal therein. The pressure actuated packing assembly is designed for use in chemically hostile environments, and for applications involving temperature and pressure differentials. The pressure actuated packing assembly automatically adjusts for wear, misalignment and service irregularities, while generally reducing the leakage and fugitive emission escape of fluid, flowing therethrough. The pressure actuated packing assembly is preferably constructed of an elastomeric energizer, a circular jacket member having an internal channel to substantially retain the elastomeric energizer and a rigid sealing insert member preferably disposed within the channel of the jacket member. The rigid sealing insert member, as a result of the system pressure within the fluid flow device, applies force to the energizer to radially expand the pressure actuated seal assembly to seal the annular area of the fluid flow device.

17 Claims, 5 Drawing Sheets

PRESSURE ACTUATED PACKING ASSEMBLY

FIELD OF THE INVENTION

The present invention relates generally to a packing assembly used to seal an annular area in fluid flow devices. Specifically, the present invention relates to a pressure actuated packing assembly for use as valve seal, a stem seal, or a rod seal, and may be used in sealing the annular area of a seal gland, positioned between corresponding orifice mating surfaces in fluid flow devices such as, valves, pumps, stuffing boxes, hydraulic devices, flow-line meters, and the like, to provide an effective and long-term seal therein. The present invention has particular application for reducing the leakage and fugitive emission escape of gas and/or liquid, flowing through fluid flow devices, wherein the devices may be exposed to temperature differentials, pressure differentials, variable surface characteristics and variable seal performance characteristics.

BACKGROUND OF THE INVENTION

Providing an effective and long-term annular seal for fluid flow devices is a continuing problem in the fluid flow industry. In order to effectively seal an annular area adjacent to a valve, stem, rod or similar sealing application, in a fluid flow device, the force or load, F applied to the seal component, must equal the pressure, P under which the seal element is exposed, multiplied by the annular area, A to be sealed (F=PA). If the force or load, F applied to the seal component does not equal the pressure, P multiplied by the annular area, A to be sealed, the seal element can not effectively seal the annular area. The known annular seals for these types of above-identified fluid flow devices have been designed on the principal of either compression type or self-energizing lip type seals, or some combination thereof. Compression type seals, also known as squeeze type seals, typically incorporate a resilient material which is exposed to a compressive stress, wherein the compressive stress supplies the energy needed to create the initial seal. This type of seal may, for example, be inserted into a gland formed by two rigid sealing surfaces, wherein the gland has a seal receiving portion which has a slightly smaller outside diameter as compared to the outside diameter of the seal. This type of seal/gland arrangement applies compressive stresses to the seal, when the two mating surfaces contact the seal. As pressure is applied to the system, the initial compressive forces are augmented by the fluid flow pressure, or system pressure.

Self-energizing lip type seals generally achieve initial sealing by placing the seal lips under bending stress and exposure to the system pressure, wherein the lips are forced tightly against the gland surfaces.

In view of current Environmental Protection Agency guidelines for allowable leakage and fugitive emissions requirements for fluid flow devices, conventional lip and compression type seals often do not comport with acceptable standards. Additionally, depending upon the particular design, lip and compression type seals are prone to premature wear and failure, requiring frequent and costly maintenance. In dynamic applications, where at least one of the orifice or gland surfaces is in motion, wear rates typically increase in response to the increase in load or force applied to the seal element. Energized seals may be especially prone to premature wear and failure in this type of application. Additionally in dynamic applications involving high system pressures, once the system pressure is removed, the high pressure forces which were exerted on the seal often damage or destroy the initial interference of the seal, which is responsible for providing the initial stresses required to seal the annular area. When the initial interference of the seal becomes damaged or destroyed, the seal may cease to properly function.

In static applications, where neither gland surface is in motion, typically, tight, compressive seals have been employed. This type of static seal, includes squeeze type seals which rely upon the compressive stress created when the gland surfaces contact the seal, to provide the initial sealing forces. These types of seals include, for example, washers, gaskets, packings, o-rings and the like. Squeeze type seals due to their construction and composition, have a limited usefulness. Further, over time, static seals may experience stress relaxation which adversely affects the resilience of the seal.

Moreover, known seal materials which are solely constructed of rubber and other elastomeric materials are generally not conducive to long-term exposure to caustic, corrosive and harsh chemicals and oils, and may break-down and/or fail in a relatively short period of time. Encapsulation and partial encapsulation of rubber and elastomeric seal devices to create a protective coating to reduce the amount of exposure of the seal to harmful substances, is expensive and greatly restricts the type of seal available, due to molding process capabilities and other restrictions. Partial encapsulation of the rubber or elastomeric seal device is less expensive, but may not avoid exposure to and break-down of the seal device. Additionally, both the full and partially encapsulated rubber or elastomeric seal devices require the use of separate back up or anti-extrusion components at higher pressures, causing additional expense and assembly. An additional problem exists with the above discussed types of seals, in that these seals do not automatically adjust to wear, misalignment, temperature and pressure differentials and the changing characteristics of the mating surfaces for which they are used.

Fluid flow devices, such as valves, pumps, stuffing boxes, hydraulic devices, flow meter orifices and the like, are typically constructed of metal, and therefore typically have orifice or gland mating surfaces which expand and contract in response to temperature and pressure differentials. Often, seal components which fit snugly within the seal receiving portion of the gland may contract with the change in temperature such that the outer diameter surface of the seal breaks contact with the inner surface of the seal receiving portion of the gland, resulting in a leak path between the seal and the gland. It would be highly advantageous to create an annular seal, which included the benefits of elastomeric materials, and which also maintained its original dimensions during temperature and pressure differentials. Seal materials such as polytetrafluoroethylene, polyvinylchloride, polyethylene and other polymer materials are highly resistant to caustic, corrosive and harsh chemicals and oils, but have little or no elastomeric properties and therefore do not adapt well to the changing temperature and pressure characteristics of the mating surfaces. Additionally, it would be advantageous to achieve an annular seal adaptable to variable surface characteristics and variable seal performance characteristics.

In view of the lack of an effective annular seal for fluid flow devices such as valves, pumps, stuffing boxes, hydraulic devices, in-line flow meters and the like, which are thermally stable, resistant to pressure and stress relaxation, and which can withstand exposure to caustic, corrosive and harsh chemicals and oils over long periods of time and can expand and contract with the changing characteristics of the mating surfaces, a need for the present invention exists.

SUMMARY OF THE INVENTION

To achieve the foregoing features and advantages and in accordance with the purpose of the invention as embodied and broadly described herein, a preferred embodiment pressure actuated seal assembly is provided for generally reducing the amount of fugitive emissions and leakage of liquid and gas, retained within a fluid flow device. The preferred embodiment pressure actuated packing assembly may preferably include at least one elastomeric energizer; a thermoplastic jacket member having an internal groove, wherein the elastomeric energizer is retained within the internal groove; and a rigid sealing insert member also disposed within the internal groove to apply force to the eleastomeric energizer and generally seal the thermoplastic jacket member. Elastomeric energizers, for example, an o-ring, are normally very vulnerable to chemical exposure. The use of an elastomeric energizer may, however, have application in chemically hostile environments when used with a chemically resistant thermoplastic jacket member. The thermoplastic jacket member of the present invention preferably has an inner peripheral side portion, an outer peripheral side portion and at least one internal U-shaped channel for retaining the elastomeric energizer, defined by the inner and outer peripheral side portions. The outer peripheral side portion of the thermoplastic jacket member may also have a first circumferential lip, and the inner peripheral side portion may preferably have a second circumferential lip. The thermoplastic jacket member also includes a continuous opening in the channel for selective insertion and removal of the elastomeric energizer. The thermoplastic jacket member may further include at least one external, axial mating surface. The rigid sealing insert member, may preferably include a first axial mating surface, a second axial mating surface, and a chemically resistant plunger portion disposed between the first and second axial mating surfaces. The rigid sealing insert member may include at least one internal circumferential groove for engagement with the first circumferential lip of the jacket member and at least one external circumferential groove for engagement with the second circumferential lip of the jacket member. The first mating surface of the rigid sealing insert member is generally retained within the U-shaped channel of said thermoplastic jacket member. The elastomeric energizer may become compressionally disposed between and in contact with a trough portion of the U-shaped channel of the thermoplastic jacket member and the first mating surface of the sealing insert member. There may also, preferably, be a gap or space between the first axial mating surface of the rigid sealing insert member and a top surface of the thermoplastic jacket member, so as to provide for limited axial movement of the rigid sealing insert member within the continuous opening, in response to the selective expansion and contraction of the elastomeric energizer to compensate for wear, temperature differentials, pressure differentials and to adjust for movement between the gland surfaces. The gap allows the plunger portion of the rigid sealing insert member to move selectively into and out of the internal U-shaped channel to maintain a continuous, effective seal of the annular area. Additionally, the thermoplastic jacket member preferably includes at least one rib member formed integrally with and extending inwardly away from the inner peripheral side portion of the jacket member and at least one rib member formed integrally with and extending outwardly away from the outer peripheral side portion of the thermoplastic jacket member. The rib members may generally be laterally positioned on the jacket wall surfaces, adjacent to the trough portion of the U-shaped channel. When pressure, P is applied to the system, the pressure, P of the system multiplied by the annular area, A to be sealed, must be equal to the force, F applied to the pressure actuated seal assembly. In the present invention, the force, F applied to the external surface of the rigid sealing insert member is equal to the pressure, P on the elastomeric energizer multiplied by the annular area, A of the axial surface of the rigid sealing insert member engaged to the elastomeric energizer. The pressure exerted on the elastomeric energizer causes the inner and outer peripheral wall portions of the jacket member to radially expand, compressing the respective rib members against the sealing surface of the gland wall and against the stem, rod, valve, etc. disposed within the pressure actuated packing assembly. The seal formed between the gland wall, the thermoplastic jacket member and the rod, piston, valve, stem, etc., forms a primary seal to generally retain the fluid flowing with the system. The seal formed by the engagement of the plunger portion of the rigid insert sealing member with the inner and outer peripheral lip portions of the thermoplastic jacket member, forms a secondary seal, which generally prevents chemical invasion into the channel and protects the elastomeric energizer.

One objective of the present invention is to provide a pressure actuated packing assembly having an elastomeric energizer, capable of expansion and contraction in response to system pressure differentials and in response to the movement of the gland or orifice mating surfaces of the fluid flow devices, wherein the elastomeric energizer is enveloped within the thermoplastic jacket, in combination with a rigid sealing insert, to protect the elastomeric energizer from harmful exposure to caustic, corrosive and harsh chemicals and oils, by creating a low pressure seal between the thermoplastic jacket and the rigid sealing insert.

Another objective of the present invention is to provide a pressure actuated packing assembly which is responsive to radial expansion for use in applications where premature wear or stress relaxation may deteriorate the seal.

Further, an objective of the present invention is to provide a pressure actuated packing assembly for use in applications where gland surfaces are not suitable for use with conventional seal devices.

Yet another objective of the present invention is to provide a pressure actuated packing assembly for use in applications where thermal cycles may otherwise reduce the efficiency of conventional seals.

Still another objective of the present invention is to provide a pressure actuated packing assembly for use in low pressure applications, wherein a minimal sealing force is required to create the seal, and thereby lowering the amount of friction and wear experienced by the pressure actuated seal assembly.

An additional objective of the present invention is to provide a pressure actuated packing assembly having a dual plunger design for excessive loading on a first axial surface and a normal or lighter load on a second axial surface, i.e. to provide for a heavy load on the static gland surface and a lighter load on the dynamic gland surface.

Moreover, another objective of the present invention is to provide a pressure actuated packing assembly, wherein the plunger portion of the rigid insert sealing member may be used in conjunction with other seals and/or packings to seal against secondary leakage that may otherwise contact the elastomeric energizer.

Still another objective of the present invention is to provide a pressure actuated packing assembly which can withstand higher loading pressure on the rib member integrally formed within and extending inwardly away from the inner peripheral side portion and on the rib member integrally formed within and extending outwardly away from the outer peripheral side portion of the thermoplastic jacket member, wherein the radial compression of the rib members compensate for the contraction of the elastomeric energizer at temperatures generally below 50° Fahrenheit.

The rigid sealing insert, in combination with the thermoplastic jacket provides the added benefit of having a variety of rigid sealing insert geometry's, such that the rigid sealing insert functions as an integral backup to generally prevent extrusion of the thermoplastic jacket member. Additionally, the combination of a soft thermoplastic jacket member with a rigid sealing insert member, provides a seal having enhanced thermal stability. Typically, soft thermoplastic materials contract significantly at low temperatures, altering the dimensions and geometry of the seal structure and often create a leak path between the seal device and the gland portion of the fluid flow device. The gap between the first axial mating surface of the rigid sealing insert member and the elastomeric energizer provides for the selective expansion and contraction of the elastomeric energizer to maintain the seal of the annular area between the orifice surfaces of the gland in the fluid flow device, during temperature and pressure differentials and to compensate for uneven wear, motion and misalignment between the orifice surfaces. By combining the rigid sealing insert member, having thermal characteristics near those of metal, with the thermoplastic jacket member and elastomeric energizer, the thermal stability of the pressure actuated packing assembly is greatly enhanced, generally providing for use of the present invention in high and low temperature applications.

BRIEF DESCRIPTION OF THE DRAWINGS

The accompanying drawings which are incorporated into and constitute a part of this specification, illustrate a preferred embodiment of the invention and together with the general description of the invention given above and the detailed description of the preferred embodiment given below, serve to explain the principals of the invention.

The above general description and the following detailed description are merely illustrative of the generic invention and additional modes, advantages and particulars will be readily suggested to those skilled in the art without departing from the spirit and scope of the invention.

DETAILED DESCRIPTION OF THE INVENTION

Figure 1:
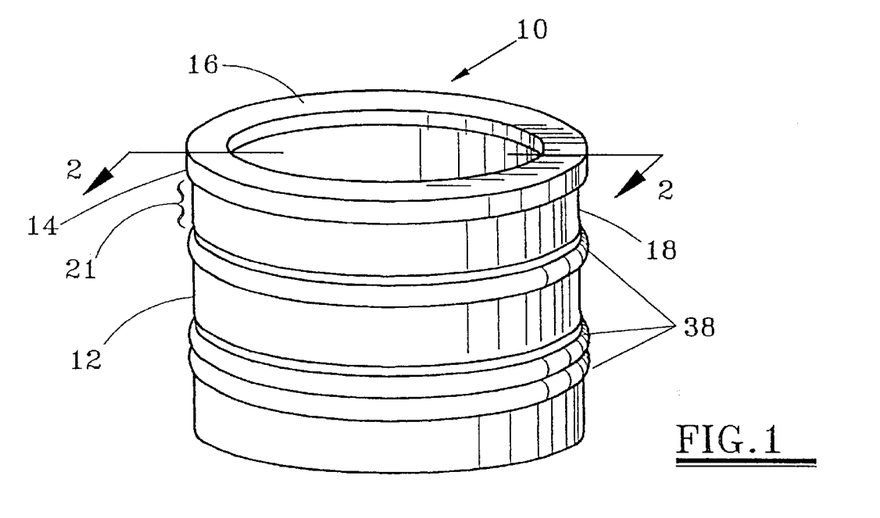
FIG. 1 is a front view of a preferred embodiment pressure actuated packing assembly, made the subject of the present invention.
Figure 1A:
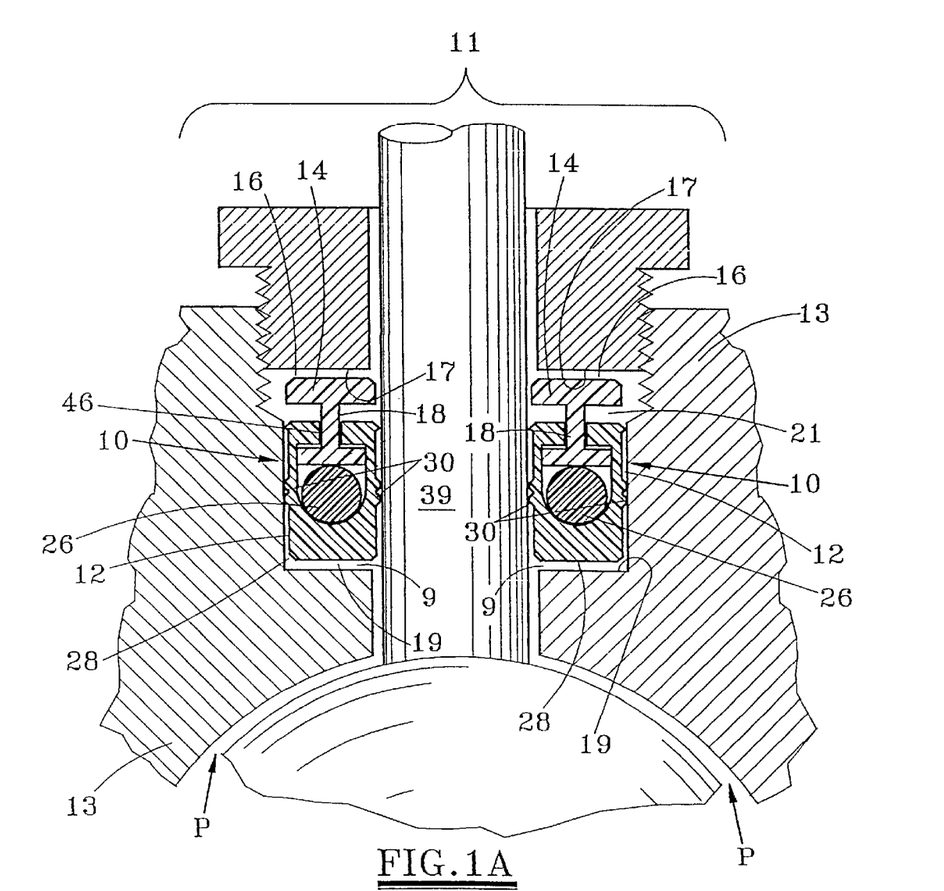
FIG. 1A is a cross-sectional view of the preferred embodiment pressure actuated packing assembly, depicted in FIG. 1, as it is used in a gland of a fluid flow device in association with a rod, piston, stem or other cylindrical member disposed with the pressure actuated packing assembly.

With reference to the drawings wherein like parts are designated by like numerals, FIGS. 1 and 1A illustrate the present invention, a preferred embodiment pressure actuated packing assembly 10 for use in sealing an annular area 9 of a gland 11, of a fluid flow device 13. The fluid flow device 13 may, for example, be a valve, pump, stuffing box, hydraulic device, in-line flow meter and similar or related devices. The external portions of the pressure actuated packing assembly 10 are comprised of a jacket member 12 and a rigid sealing insert member 14. The rigid sealing insert member 14 includes a first axial mating surface 16 for engagement to a first orifice mating surface 17 of the gland 11 of the fluid flow device 13. The pressure actuated packing assembly 10 also includes a gap or expansion/contraction space 21 between the first axial mating surface 16 of the rigid sealing insert member 14 and the jacket member 12.

The rigid sealing insert member 14 also includes a plunger portion 18 which is received within the jacket member 12.

With reference now to FIGS. 1, 1A, 2, 3A, 3B and 3C, the preferred embodiment pressure actuated packing assembly 10 is shown in greater detail. The jacket member 12 includes an inner peripheral side portion 20, an outer peripheral side portion 22 and an internal U-shaped channel 24, defined by the inner peripheral side portion 20 and the outer peripheral side portion 22 and a trough portion 23. An elastomeric energizer 26 is preferably retained within the U-shaped channel 24, to provide resiliency and radial expansion capability to the pressure actuated packing assembly 10. The jacket member 12 has a first axial mating surface 28 for compressional engagement to the system pressure, and alternatively, for possible engagement to a second orifice mating surface 19 of the gland 11 of the fluid flow device 13. The outer peripheral side portion 22 of the jacket member 12 also preferably includes a first circumferential lip 32 and the inner peripheral side portion 20 includes a second circumferential lip 34. The jacket member 12 also preferably includes a continuous longitudinal opening 36 for insertion of the elastomeric energizer 26 and to accommodate the reciprocating motion of the plunger portion 18 of the rigid sealing insert member 14 into and out of the U-shaped channel 24. The jacket member 12 also preferably includes one or more rib members 38 which are formed integrally with and extend inwardly away from the inner peripheral side portion 20 of the jacket member 12 and are formed integrally with and extend outwardly away from the outer peripheral side portion 22 of the jacket member 12.

Figure 17:
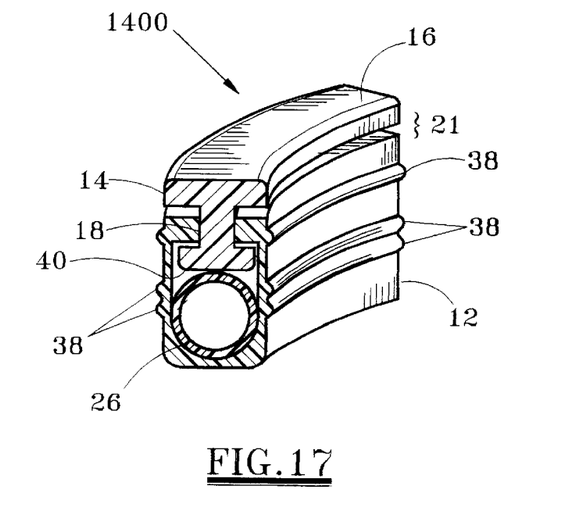
FIG. 17 is a cross-sectional, partial-perspective view of a fourteenth alternated embodiment pressure actuated packing assembly, illustrating an energizer comprised of a metal spring.

With reference now to FIGS. 1–3C and 9, radial expansion of the jacket member 12 in combination with compression of the elastomeric energizer 26 as a result of the force F applied by the pressure P of the system, multiplied by an annular area 9 to be sealed, preferably forms a primary seal 30 in the fluid flow device 13. The jacket member 12 is preferably comprised of one or a combination of the materials, including polytetrafluoroethylene, filled polytetrafluoroethylene, ultra high molecular weight polyethylene, urethane materials and soft polyamids. The elastomeric energizer 26 is preferably comprised of one or a combination of the materials, including: chloroprene, ethylene propylene, silicone, fluorosilicone, nitrile-butadiene and various fluorocarbon elastomers. Alternatively, the energizer 26 can be an energized flat band coil spring, as depicted in FIG. 17, below. As discussed below, the elastomeric energizer 26 may, for example, be pre-molded as a separate member or may be molded directly into the jacket member 12, as depicted in FIGS. 4 and 5.

Figure 3A:
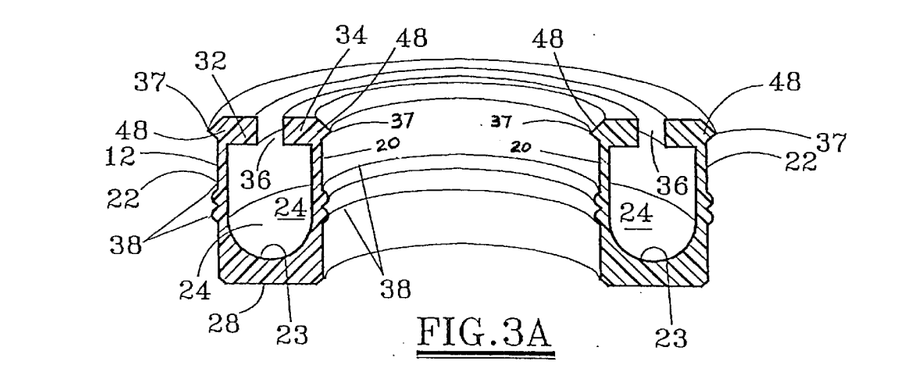
FIG. 3A is a cross-sectional, perspective view of the thermoplastic jacket member of the present invention, depicted in FIG. 2.
Figure 3B:
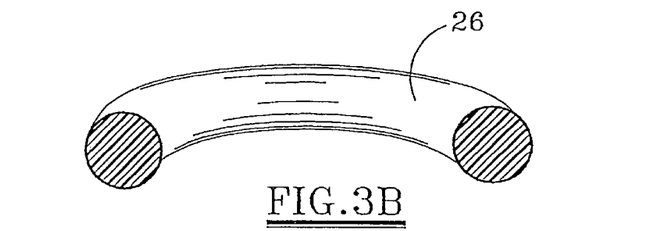
FIG. 3B is a cross-sectional, perspective view of the elastomeric energizer of the present invention, depicted in FIG. 2.
Figure 3C:
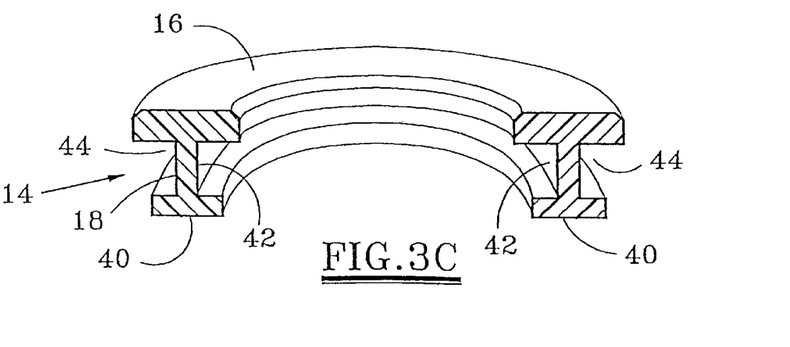
FIG. 3C is a cross-sectional, perspective view of the rigid sealing insert member of the present invention, depicted in FIG. 2.
Figures 4, 5, 6, 7:
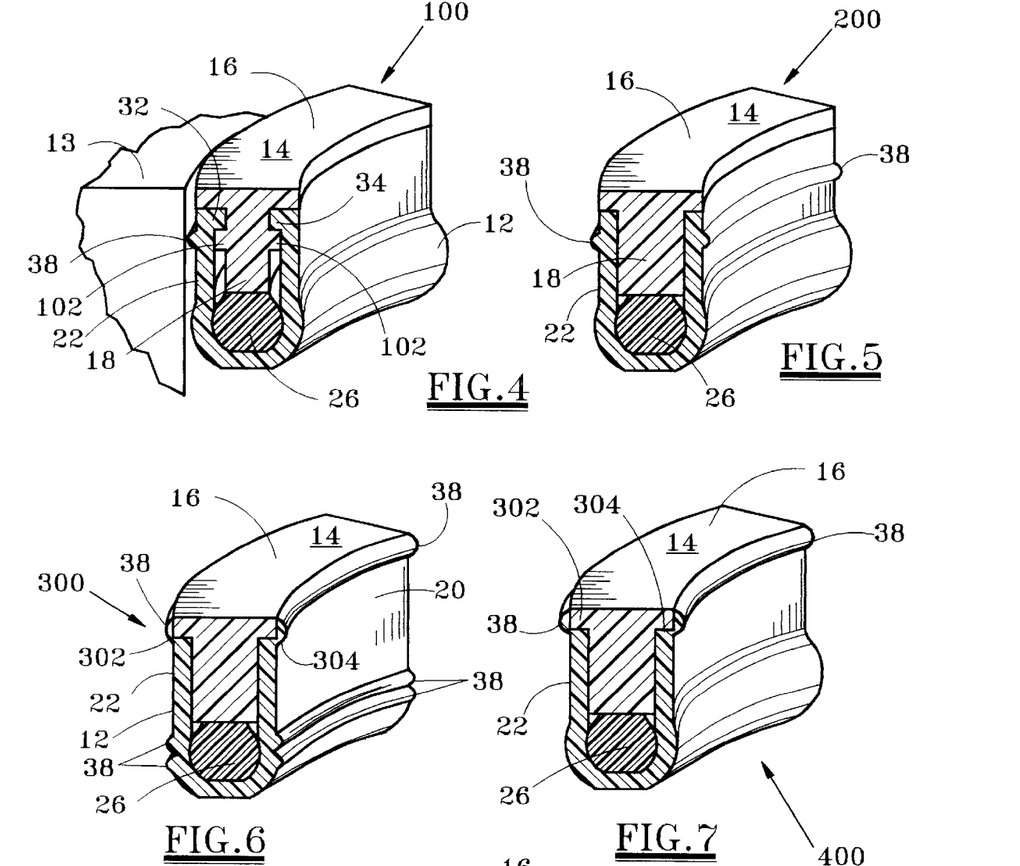
FIG. 4 is a cross-sectional, partial-perspective view of a first alternate embodiment pressure actuated packing assembly.
FIG. 5 is a cross-sectional, partial-perspective view of a second alternate embodiment pressure actuated packing assembly.
FIG. 6 is a cross-sectional, partial-perspective view of a third alternate embodiment pressure actuated packing assembly.
FIG. 7 is a cross-sectional, partial-perspective view of a fourth alternate embodiment pressure actuated packing assembly.

As shown in FIG. 3, the rigid sealing insert member 14 has a second axial mating surface 40 which is preferably retained within the U-shaped channel 24 for selective compressive engagement with the elastomeric energizer 26. As the primary seal 30 expands and contracts in response to temperature and pressure fluctuations, the second axial mating surface 40 moves axially in compressive engagement to and from the elastomeric energizer 26. As the radial expansion of the jacket member 12 and elastomeric energizer 26 increase to form the primary seal 30, pressure increases on the elastomeric energizer 26 and the shape of the elastomeric energizer 26 is transformed from a generally cylindrical configuration, i.e. the at rest position shown in FIG. 3B, to a flattened and compressed position, which urges the rib members 38 to seal against the gland 11 surface and a cylindrical member 39. The elastomeric properties of the elastomeric energizer 26 provide for a consistent and continuous primary seal 30, even in situations where the characteristics of the mating surfaces 17, 19 of the fluid flow device 13 have changed, as well as any changes in temperature and/or pressure within the fluid flow device 13, and changes in the surface characteristics of the primary seal 30, without generally exposing the elastomeric energizer 26 to harsh chemicals or otherwise damaging the elastomeric energizer 26. The rigid sealing insert member 14 also includes an inner circumferential groove 42 and an outer circumferential groove 44, adjacent to the plunger portion 18. The rigid sealing insert member 14 may preferably be composed of a rigid material such as, for example, poly phenaline sulfide (PPS) or poly ether ether keyton (PEEK) metal, having thermal characteristics similar to those of metallic materials. The rigid sealing insert member 14 may also be constructed of FYFE with high levels of fillers such as carbon, glass or PPS.

Figure 2:
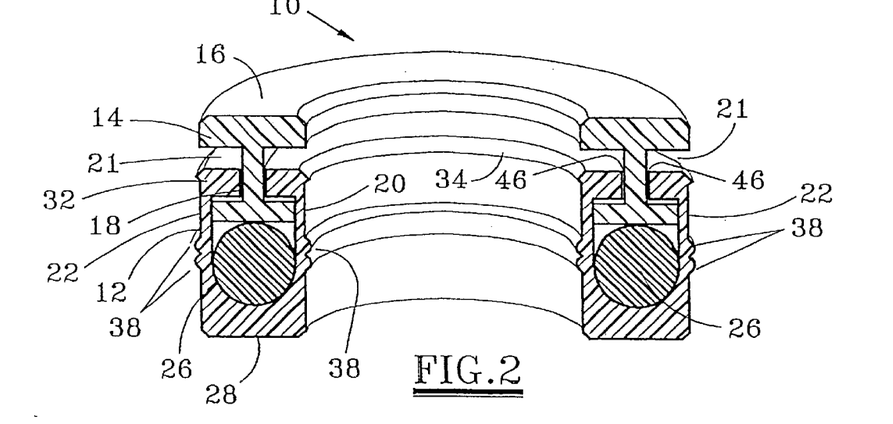
FIG. 2 is a cross-sectional view of the preferred embodiment pressure actuated, packing assembly, depicted in FIG. 1.

Engagement of the plunger portion 18 of the rigid sealing insert member 14 within the first circumferential lip 32 and the second circumferential lip 34 of the jacket member 12, provides a secondary seal 46 to generally reduce the liquid and/or gas exposure to the elastomeric energizer 26. Further, one or more secondary rib members 37 may be formed to an outer peripheral end 48 of the first and second circumferential lips 32, 34, away from a opening 36 between the first and second circumferential lips 32, 34 which preferably engage the plunger portion 18. The one or more secondary rib members 37 formed to the first circumferential lip 32 and the second circumferential lip 34 of the jacket member 12, when in contact with a gland 11 surface of the fluid flow device 13 produces radial compression of the relatively softer jacket member 12 against the plunger portion 18 of the rigid sealing insert member 14 to form the low pressure secondary seal 46.

OPERATION

With reference now to FIGS. 1, 1A, 2, 3A, 3B, 3C and 9 the function of the sealed packing ring 10 will be described. The present invention is preferably deployed within the seal gland 11 and is secured between corresponding orifice mating surfaces 17, 19 of the fluid flow device 13. A rod, piston, stem, or some other type of cylindrical member 39 is preferably disposed concentrically within the jacket member 12 and is preferably in radial contact and compression with the one or more rib members 38 on the inner peripheral side wall 20. When the system pressure P is introduced to the pressure actuated packing assembly 10, a force F is applied to the first axial mating surface 28 of the jacket member 12, which in turn causes the first axial mating surface 16 of the rigid sealing insert member 14 to engage the first orifice mating surface 17. The rigid sealing insert 14 then applies a force F against the energizer 26, which radially expands the jacket member 12 and urges the rib members 38 to seal against the gland 11 surface and also to seal against the cylindrical member 39, thereby forming the primary seal 30, between the cylindrical member 39, the jacket member 12 and the surface of the gland 11. Additionally, radial compression is applied to the plunger portion 18 of the rigid sealing insert 14 by the one or more distal ends 48 of the first and second circumferential lips 32, 34 to form the secondary seal 46 between the plunger portion 18 and the inner circumferential lip 34 and outer circumferential lip 32, to generally restrict the amount of fluid invasion into the U-shaped channel 24 and to generally reduce the exposure and damage to the elastomeric energizer 26. Further, the one or more rib members 38, integrally formed on the inner peripheral side portion 20 of the jacket member 12, are designed to sealingly engage the cylindrical member 39 to generally restrict the escape of fluid through the inner peripheral side portion 20 of the jacket member 12.

While the rib members 38 are important for imparting radial compression on the gland wall 11 and cylindrical member 39 to form the primary seal 30, the gap 21 between the rigid sealing insert member 14 and the jacket member 12 provides for selective movement of the plunger portion 18 within the opening 36 in the U-shaped channel 24 to maintain adequate force F on the elastomeric energizer 26, wherein the pressure P experienced by the elastomeric energizer multiplied by the annular area 9 of the second axial mating surface 40 is equal to the force F exerted by the plunger portion 18. Additionally, the gap 21 allows for the uneven positioning of the rigid sealing insert member 14 within the jacket member 12 for creating an effective primary seal 30 in spite of uneven, misaligned, rough-surfaced or dynamic orifice surfaces, while maintaining contact between the orifice surface 17 of the gland 11 and the first axial mating surface 16 of the rigid sealing insert member 14.

Additionally, there may be numerous alternate embodiments of the present invention, as depicted in FIGS. 4–17, depending upon specific application and the desired qualities and characteristics necessary for that application. Structure similar to that illustrated in FIGS. 1–3C, is similarly numbered in FIGS. 4–17. FIG. 4 illustrates a first alternate embodiment pressure actuated packing assembly 100, wherein the elastomeric energizer 26 has an oval-shaped cross-section, which has been "molded" into the jacket member 12. The plunger portion 18 of the rigid sealing insert includes a plurality of protrusions 102 which may serve as a back up device for a jacket member 12 constructed of soft materials. The first alternate embodiment pressure actuated packing assembly 100 includes a single rib member 38 on the outer peripheral wall portion 22 laterally adjacent to the protrusions 102.

In FIG. 5, a second alternate embodiment pressure actuated packing assembly 200 is depicted. The second alternate embodiment pressure actuated packing assembly 200 also includes a pre-molded and inserted elastomeric energizer 26. The elastomeric energizer 26 could, for example, be molded in a square or rectangular shape. Additionally, the jacket member 12 of the second alternate embodiment pressure actuated packing assembly 200 does not include circumferential lips 32, 34 as depicted in FIG. 4.

In FIG. 6, a third alternate embodiment pressure actuated packing assembly 300 is depicted. The third alternate embodiment pressure actuated packing assembly 300 includes a first inset shoulder portion 302 in the outer peripheral wall portion 22 of the jacket member 12 and a second inset shoulder portion 304 in inner peripheral wall portion 20 of the jacket member 12, wherein the first axial surface 16 of the sealing insert member 14 is substantially retained within the jacket member 12. The third alternate embodiment pressure actuated packing assembly 300 does not include a back up configuration 102 as does the first alternate embodiment pressure actuated packing assembly 100 shown in FIG. 4.

In FIG. 7, a fourth alternate embodiment pressure actuated packing assembly 400 is depicted. The fourth alternate embodiment pressure actuated packing assembly 400 is similar in design to the third alternate embodiment pressure actuated packing assembly 300, with the exception that there are no rib members 38 integrally formed in the inner and outer peripheral wall portions 22, 21 of the jacket member 12, laterally adjacent to the elastomeric energizer 26, as shown in the third alternate embodiment pressure actuated packing assembly 300, in FIG. 6.

Figure 8:
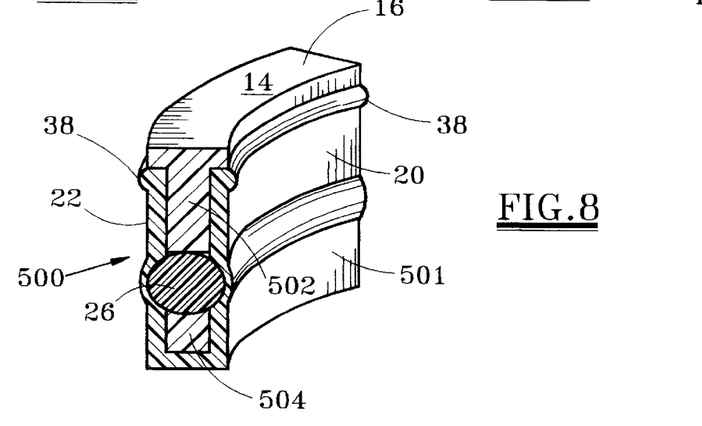
FIG. 8 is a cross-sectional, partial-perspective view of a fifth alternate embodiment pressure actuated packing assembly.

In FIG. 8, a fifth alternate embodiment pressure actuated packing assembly 500 is depicted. The fifth alternate embodiment pressure actuated packing assembly 500 includes an alternate embodiment jacket member 501, designed for an upper rigid sealing insert 502 and a lower rigid sealing insert 504. The fifth alternate embodiment pressure actuated packing assembly 500 provides the advantage of improved thermal stability.

Figures 9, 10, 11, 12:
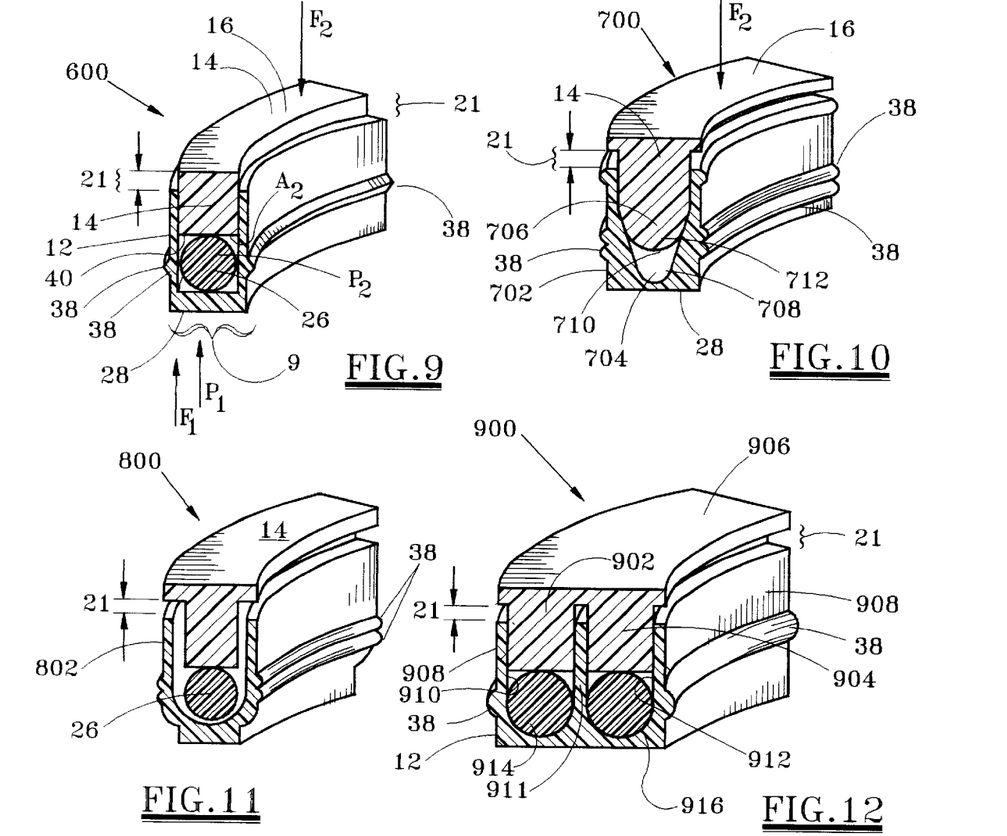
FIG. 9 is a cross-sectional, partial-perspective view of a sixth alternate embodiment pressure actuated packing assembly.
FIG. 10 is a cross-sectional, partial-perspective view of a seventh alternate embodiment pressure actuated packing assembly.
FIG. 11 is a cross-sectional, partial-perspective view of a eighth alternate embodiment pressure actuated packing assembly.
FIG. 12 is a cross-sectional, partial-perspective view of a ninth alternate embodiment pressure actuated packing assembly.

In FIG. 9, a sixth alternate embodiment pressure actuated packing assembly 600 is depicted. The sixth alternate embodiment pressure actuated packing assembly 600 includes the gap 21 as shown in the preferred embodiment pressure actuated packing assembly 10, and functions in the same manner. Additionally, the rib members 38 may be "v" or wedge-shaped. As pressure $P_1$ from the system is applied to the annular area 9 to be sealed, a force $F_1$ is created against the first axial mating surface 28 of the jacket member 12. The force $F_1$ causes the first axial mating surface 16 of the rigid sealing insert member 14 to contact an orifice mating surface (not shown) which creates a second force $F_2$, which in turn creates pressure $P_2$ on the elastomeric energizer 26 by engaging the annular area 40 or $A_2$ against the elastomeric energizer 26. An effective seal 30 is formed, as depicted in FIG. 1A, wherein $P_1$ multiplied by the annular area 9 is equal to $F_1$ and $P_2$ multiplied by the annular area $A_2$ is equal to $F_2$.

In FIG. 10 a seventh alternate embodiment pressure actuated packing assembly 700 is illustrated. The seventh alternate embodiment pressure actuated packing assembly 700 includes an alternate embodiment jacket member 702 having a generally V-shaped channel 704. The seventh alternate embodiment pressure actuated packing assembly 700 also preferably includes a sealing insert member 14 having a first tapered axial mating surface 706 for engaging the V-shaped channel 704. The seventh alternate embodiment pressure actuated packing assembly 700, unlike the preferred embodiment 10, shown in FIG. 1, and alternate embodiment 100, 200, 300, 400, 500, and 600 pressure actuated packing assemblies, does not include a separate elastomeric energizer 26 member. The V-shaped channel 704 includes a trough portion 708 which is slightly narrower in width as compared to a nose portion 710 of the sealing insert member 14. The slightly narrower trough portion 708 applies a bias or spring-like pressure against the first tapered axial mating surface 712 during the free state or at rest position. The force $F_2$ creates radial expansion of the jacket member 702 to urge the rib members 38 to seal against the gland surface (not shown) and cylindrical member (not shown) which is preferably disposed concentrically within the seventh alternate embodiment pressure actuated packing assembly 700.

An eighth alternate embodiment pressure actuated packing assembly 800 is illustrated in FIG. 11. The general structure of the eighth alternate embodiment pressure actuated packing assembly 800 is similar to the preferred embodiment pressure actuated packing assembly 10, shown in FIGS. 1, 1A, 2, 3A, 3B, and 3C, however the jacket member 802 of the eighth alternate embodiment pressure actuated packing assembly 800 does not include any circumferential lip members 32, 34 as provided for in the preferred embodiment 10.

A ninth alternate embodiment pressure actuated packing assembly 900 is disclosed in FIG. 12. The ninth alternate embodiment sealed packing ring apparatus 900 is structurally similar to the eighth alternate embodiment pressure actuated packing assembly 800, with the exception that the ninth alternate embodiment pressure actuated packing assembly 900 includes a first plunger portion 902 and a second plunger portion 904 integrally formed with a common and singular first axial mating surface 906 and an alternate embodiment jacket member 908 includes a first channel 910 for reception of the first plunger portion 902 and a second channel 912 for reception of the second plunger portion 904, wherein the channels 910, 912 are conjoined at a common interior or intermediate wall 911. The plunger portions 902, 904 may, for example, be of unequal lengths to provide for a "tilting" of the first axial mating surface 906 to achieve a desired effect. The ninth alternate embodiment pressure actuated packing assembly 900 also includes a gap 21 between the first axial mating surface 906 and the jacket member 908 to provide for axial movement of the plunger portions 902, 904. The ninth alternate embodiment sealed packing ring 900 also preferably includes a first elastomeric energizer 914 retained within the first channel 910 and a second elastomeric energizer 916 retained the second channel 912.

Figures 13, 14:
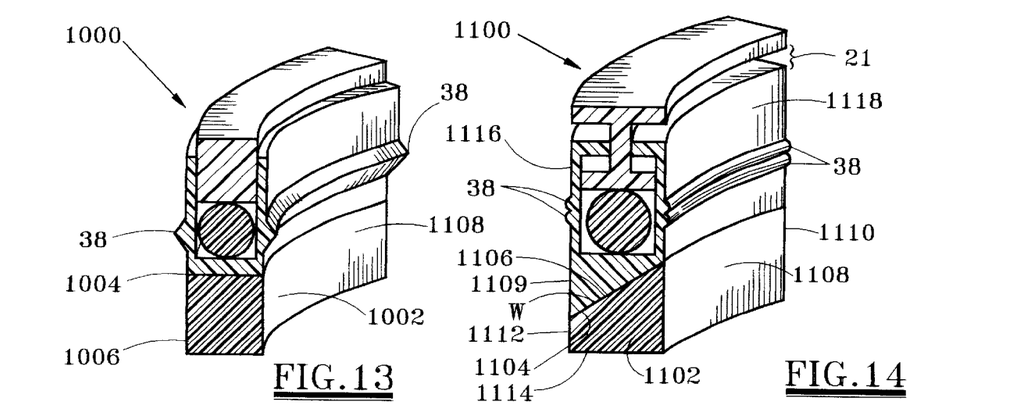
FIG. 13 is a cross-sectional, partial-perspective view of a tenth alternate embodiment pressure actuated packing assembly.
FIG. 14 is a cross-sectional, partial-perspective view of a eleventh alternate embodiment pressure actuated packing assembly.

In FIG. 13, a tenth alternate embodiment pressure actuated packing assembly 1000 is depicted. The tenth alternate embodiment pressure actuated packing assembly 1000 is similar to the sixth alternate embodiment pressure actuated packing assembly 600, as depicted in FIG. 9, but is used in combination with a conventional seal or packing 1002. As illustrated, the conventional seal or packing 1002 may be, for example, cylindrical and ring-like, having at least one or more generally flat mating surfaces 1004 to engage the sixth alternate embodiment pressure actuated packing assembly 600. Additionally, the conventional seal or packing 1000, may preferably have a generally vertical inner wall portion 1008 and a generally vertical outer wall portion 1006, wherein the generally vertical outer wall portion 1006 preferably engages an inner gland surface (not shown). Normally, conventional seals or packings 1002 are constructed of an elastomeric material which expands and contracts in response to differentials in temperature and pressure. In the past, conventional seals or packings 1002 have had a tendency to pull away or separate from the gland wall (not shown) when the conventional seal or packing 1002 experiences contraction due to temperature or pressure differentials. Should the conventional seal or packing 1002 contract and pull away from the gland wall (not shown) while the system is under pressure, a leak path (not shown) may form between the generally vertical outer wall portion 1006 of the conventional seal or packing 1002 and the gland wall (not shown).

In FIG. 14, an eleventh alternate embodiment pressure actuated packing assembly 1100 is illustrated in operable engagement with a power bevel seal or packing 1102. The power bevel 1102 preferably has an inclined mating surface 1104 which engages an inclined mating surface 1106 of the eleventh alternate embodiment pressure actuated packing assembly 1100. The power bevel 1102 preferably provides the inclined mating surface 1104 such that an apex 1108 of the inclined mating surface 1104 is adjacent to an inner vertical wall 1110 of the power bevel 1102 and a base 1109 of the inclined mating surface 1104 is adjacent to an outer vertical wall 1112 of the power bevel 1102. The outer vertical wall 1112 of the power bevel 1102 is shorter in length as compared to the inner vertical wall 1110 of the power bevel 1102. The pitch angle W of the power bevel 1102 may, for example, be in the range of 30° to 45. The inclined mating surface 1104 of the power bevel 1102 preferably pitches downward toward the outer periphery 1114 of the power bevel 1102, such that the inclined mating surface 1104 of the power bevel 1102 in compressed engagement with the inclined surface 1106 of the eleventh alternate embodiment pressure actuated packing assembly 1100, applies force to maintain continuous contact between an outer vertical wall portion 1116 of the eleventh alternate embodiment pressure actuated packing assembly 1100 and the surface of the gland (not shown). The outer vertical wall portion 1116 of the eleventh alternate embodiment sealed packing ring 1100 may, for example, be longer in length as compared to an inner vertical wall portion 1118. In all other respects however, the eleventh alternate embodiment pressure actuated packing assembly 1100 is structurally and functionally similar to the preferred embodiment pressure actuated packing assembly 10, illustrated in FIGS. 1, 1A, 2, 3A, 3B and 3C.

Figure 15:
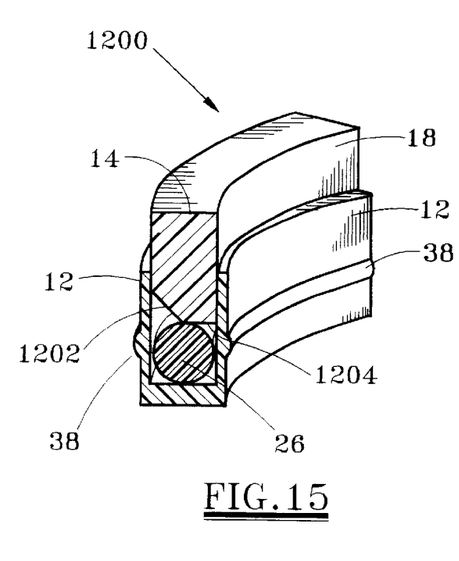
FIG. 15 is a cross-sectional, partial-perspective view of a twelfth alternate embodiment pressure actuated packing assembly.

A twelfth alternate embodiment pressure actuated packing assembly 1200 is illustrated in FIG. 15. The twelfth alternate embodiment pressure actuated packing assembly 1200 includes a jacket member 12, a plunger portion 18 and an elastomeric energizer 26. The twelfth alternate embodiment pressure actuated packing assembly 1200 differs from the sixth alternate embodiment pressure actuated packing assembly 600, in that the plunger portion 18 of the twelfth alternate embodiment pressure actuated packing assembly 1200 includes a beveled edge portion 1202 in a first axial mating surface 1204 of the plunger portion 18 to urge the elastomeric energizer 26 toward the gland wall surface (not shown). In all other respects, the eleventh alternate embodiment pressure actuated packing assembly 1200 functions compatibly with the sixth alternate embodiment pressure actuated packing assembly 600, including the at least one rib member 38 formed integrally with the jacket member 12. The beveled edge portion 1202 in the first axial mating surface 1204 of the plunger portion 18 is designed to engage the elastomeric energizer 26, in such a manner so as to produce additional loading pressure on the energizer 26.

Figure 16:
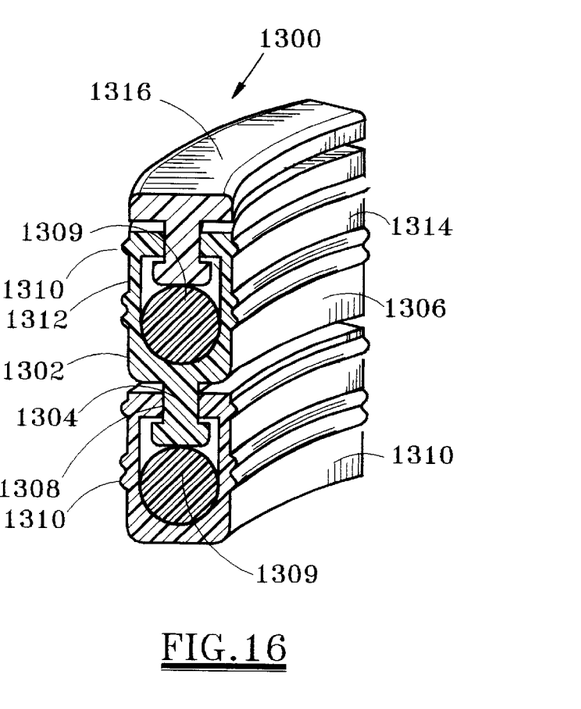
FIG. 16 is a cross-sectional, partial-perspective view of a thirteenth alternate pressure actuated packing assembly, illustrating a stacked arrangement.

A thirteenth alternate embodiment pressure actuated packing assembly 1300 is illustrated in FIG. 16. The thirteenth alternate embodiment pressure actuated packing assembly 1300 is functionally equivalent to the preferred embodiment pressure actuated packing assembly 10 illustrated in FIGS. 1, 1A, 2, 3A, 3B, and 3C. The thirteenth alternate embodiment pressure actuated packing assembly 1300 teaches the vertical stacking of the preferred embodiment pressure actuated packing assembly 10, wherein a thirteenth alternate embodiment jacket member 1302 includes the formation of a thirteenth alternate embodiment seal insert member 1304 integrally formed in the first axial mating surface or base 1306 of the jacket member 1302. The thirteenth alternate embodiment seal insert member 1304 is received within a continuous opening 1308 in the thirteenth alternate embodiment jacket member 1302, just as taught in the preferred embodiment pressure actuated packing assembly 10 and engages an elastomeric energizer 1309. The thirteenth alternate embodiment jacket member 1302 also includes at least one rib member 1310 integrally formed in the inner peripheral side portion 1312 and the outer peripheral side portion 1314 of the thirteenth alternate embodiment jacket member 1302. The thirteenth alternate embodiment pressure actuated packing assembly 1300 may, for example, comprise one or more thirteenth alternate embodiment jacket member 1302, two or more elastomeric energizers 1309 and a seal insert member 1316 as taught in the preferred embodiment pressure actuated packing assembly 10, arranged in an operable configuration as shown in FIG. 16.

A fourteenth alternate embodiment pressure actuated packing assembly 1400 is illustrated in FIG. 17. The fourteenth alternate embodiment pressure actuated packing assembly 1400 is functionally equivalent to the preferred embodiment pressure actuated packing assembly 10 illustrated in FIGS. 1, 1A, 2, 3A, 3B, and 3C. The fourteenth alternate embodiment pressure actuated packing assembly 1400 teaches the use of a flat band coil spring and similar type spring devices for use as the energizer 26.

The foregoing description of the invention is illustrative and explanatory thereof. Various changes in the materials, apparatus, and particular parts employed will be apparent to those skilled in the art. It is intended that all such variations within the scope and spirit of the appended claims be embraced thereby.

what is claimed is:

1. A pressure actuated packing assembly for use in sealing an annular area of a fluid flow device, said packing assembly comprising:

an elastomeric energizer;

a jacket member, within said jacket member said elastomeric energizer is retained and generally protected from chemical invasion, said jacket member having an inner peripheral wall portion, the inner peripheral wall portion having a second circumferential lip, an outer peripheral wall portion, the outer peripheral wall portion having a first circumferential lip, a continuous internal channel defined by the inner and outer peripheral wall portions, said channel retaining said elastomeric energizer and having a continuous opening therein for selective insertion and selective removal of said elastomeric energizer; and a pressure actuated sealing insert member, having a first axial mating surface, a second axial mating surface and a plunger portion disposed between the first axial mating surface and the second axial mating surface, the plunger portion includes at least one outer circumferential groove for engagement with the first circumferential lip and at least one inner circumferential groove for engagement with the second circumferential lip, wherein compressional engagement between the first circumferential lip and the outer circumferential groove and compressional engagement between the second circumferential lip and the inner circumferential groove, creates a secondary seal to generally avoid invasion to the elastomeric energizer, the second axial mating surface being substantially retained within the channel of said Jacket member, and being axially movable within the channel of said jacket member for compressional engagement with said elastomeric energizer, in response to the system pressure within said fluid flow device.

2. The pressure actuated packing assembly for use in sealing an annular area of a fluid flow device, as defined in claim 1 wherein the channel is U-shaped, having an internal trough portion distal to the continuous opening.

3. The pressure actuated packing assembly for use in sealing an annular area of a fluid flow device, as defined in claim 1, wherein the jacket member is comprised of a thermoplastic material.

4. The pressure actuated packing assembly for use in sealing an annular area of a fluid flow device, as defined in claim 1, wherein the outer peripheral wall portion of said jacket member comprises at least one rib member formed integrally therein and extending outwardly away from the outer peripheral wall portion.

5. The pressure actuated packing assembly for use in sealing an annular area of a fluid flow device, as defined in claim 1, wherein the outer peripheral wall portion and the inner peripheral wall portion of the jacket member each include at least one rib member integrally formed in each respective peripheral wall portion and the at least one rib member extends from each respective peripheral wall portion of said jacket member.

6. The pressure actuated packing assembly for use in sealing an annular area of a fluid flow device, as defined in claim 5, wherein a first rib member is preferably formed on the inner peripheral side portion and the outer peripheral side portion of said jacket member, adjacent to the first axial mating surface of said sealing insert member, and a second rib member is preferably formed on the inner peripheral side portion and the outer peripheral side portion of said jacket member, adjacent to a trough portion of the channel.

7. The pressure actuated packing assembly for use in sealing an annular area of a fluid flow device, as defined in claim 6, wherein said elastomeric energizer selectively expands and contracts, in response to the pressure exerted on said elastomeric energizer by said sealing insert member, to urge said second rib member in sealing engagement against a gland wall surface, to create a primary seal of the annular area of the fluid flow device.

8. The pressure actuated packing assembly for use in sealing an annular area of a fluid flow device, as defined in claim 6, wherein said elastomeric energizer selectively expands and contracts, in response to the pressure exerted on said elastomeric energizer by said sealing insert member, to urge said second rib member in sealing engagement against a cylindrical work piece concentrically disposed within the pressure actuated packing assembly, to create a primary seal of the annular area of the fluid flow device.

9. The pressure actuated packing assembly for use in sealing an annular area of a fluid flow device, as defined in claim 6, wherein the radial compression of the elastomeric energizer creates axial expansion of the jacket member to urge the one or more rib members of the jacket member into sealing engagement with a gland wall surface of the fluid flow device and into sealing engagement with a cylindrical work piece concentrically disposed within the pressure actuated packing assembly, to create a primary seal of the annular area of the fluid flow device.

10. The pressure actuated packing assembly for use in sealing an annular area of a fluid flow device, as defined in claim 1, wherein said elastomeric energizer is molded into said jacket member.

11. The pressure actuated packing assembly for use in sealing an annular area of a fluid flow device, as defined in claim 1, wherein said elastomeric energizer is comprised of a circular, flat band coil spring.

12. The pressure actuated packing assembly for use in sealing an annular area of a fluid flow device, as defined in claim 1, wherein the jacket member is comprised of one or a combination of the following materials: PTFE, filled PTFE, ultra high molecular weight polyethylene, urethane materials and soft polyamids.

13. The pressure actuated packing assembly for use in sealing an annular area of a fluid flow device, as defined in claim 1, wherein the channel is V-shaped, having an internal trough portion distal to the continuous opening.

14. The pressure actuated packing assembly for use in sealing an annular area of a fluid flow device, as defined in claim 1, wherein the first axial mating surface of said sealing insert member is integrally formed to the base of said jacket member, such that a plurality of jacket members can be stacked and connected in succession, to form a plurality of axially positioned primary seals between a gland surface and a cylindrical work piece.

15. The pressure actuated packing assembly for use in sealing an annular area of a fluid flow device, as defined in claim 14, wherein at least one rib member is integrally formed in the outer peripheral wall portion and the inner peripheral wall portion of said jacket member.

16. A pressure actuated packing assembly for use in sealing an annular area of a fluid flow device, said packing assembly comprising:

an elastomeric energizer;

a jacket member, within said jacket member said elastomeric energizer is retained and generally protected from chemical invasion, said jacket member having an inner peripheral wall portion, an outer peripheral wall portion, a continuous internal channel defined by the inner and outer peripheral wall portions, said channel retaining said elastomeric energizer and having a continuous opening therein for selective insertion and selective removal of said elastomeric energizer; and a pressure actuated sealing insert member, having a first axial mating surface, a second axial matins surface and a plunger portion disposed between the first axial mating surface and the second axial mating surface, the second axial mating surface being substantially retained within the channel of said jacket member, the second axial mating surface being, axially movable within the channel of said jacket member for compressional engagement with said elastomeric energizer, in response to the system pressure within said fluid flow device and the second axial mating surface of the sealing insert member further comprises at least one protruded member which functions as a back-up member to support the inner peripheral wall portion and the outer peripheral wall portion of the jacket member.

17. A pressure actuated packing assembly for use in sealing an annular area of a fluid flow device, said packing assembly comprising:

an elastomeric energizer;

a jacket member, within said jacket member said elastomeric energizer is retained and generally protected from chemical invasion, said jacket member having an inner peripheral wall portion, an outer peripheral wall portion, a continuous internal channel defined by the inner and outer peripheral wall portions, said channel retaining said elastomeric energizer and having a continuous opening therein for selective insertion and selective removal of said elastomeric energizer;

a pressure actuated sealing insert member, having a first axial mating surface, a second axial mating surface and a plunger portion disposed between the first axial mating surface and the second axial mating surface, the second axial mating, surface being substantially retained within the channel of said jacket member, and being axially movable within the channel of said jacket member for compressional engagement with said elastomeric energizer, in response to the system pressure within said fluid flow device; and a single, continuous, circular power bevel packing, wherein the first axial mating surface of said jacket member is inclined and the mating surface of the power bevel packing is reciprocally inclined to receive the jacket member, such that the respective mating surfaces of the jacket member and the power bevel packing form a continuous, circular contact to urge the outer peripheral wall portion of said jacket member, to form a seal with a gland wall surface.

* * * * *